UNITED STATES PATENT OFFICE 1,949,228

AZO DYESTUFF

Hermann Winkeler and Hans Reindel, Ludwigshafen-on-the-Rhine, and Guido Freiherr von Rosenberg, Mannheim, Germany, assignors to General Aniline Works, Inc., New York, N. Y., a corporation of Delaware No Drawing. Application April 22, 1933
Serial No. 667,496

7 Claims. (Cl. 260—87)

The present invention relates to new azo-dyestuffs capable of forming complex chromium compounds yielding very equal dyeings on wool which have good fastness properties, especially extremely high fastness to light, and a process of making the said dyestuff.

We have found that dyestuffs of considerable value can be obtained by coupling 1-phenyl-5-pyrazolone-3-carboxylic acid amide or its derivatives substituted on the amido nitrogen atom with the diazo compounds of the compounds corresponding to the formula

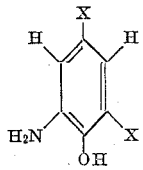

wherein one X stands for the sulphonic acid group and the other X for a substituent selected from the class consisting of chlorine and the alkyl groups, especially the methyl group. As derivatives of 1-phenyl-5-pyrazolone-3-carboxylic acid amide of the aforesaid kind may be mentioned 1-phenyl-5-pyrazolone-3-carboxylic acid ethylamide and 1-phenyl-5-pyrazolone-3-carboxylic acid hydroxy-ethyl amide.

The said dyestuffs dye wool usually orange shades. If the dyestuffs are used for dyeing chrome-mordanted wool or if dyeings obtained with the said dyestuffs on wool are after-chromed, from Bordeaux or bluish to yellowish-red dyeings of extremely valuable properties are obtained; these dyeings have excellent fastness properties, especially an excellent fastness to light, and a very good equalizing power. The azo-dyestuffs in question may be converted into valuable complex chromium compounds by treating the dyestuffs in substance, i. e. not on the fibre, with compounds supplying chromium.

Example 1

223 parts of 1-hydroxy-2-amino-6-chlorobenzene-4-sulphonic acid are diazotized in the usual manner and the solution of the diazo compound formed is added to a solution of 210 parts of 1-phenyl-5-pyrazolone-3-carboxylic acid amide in a mixture of 250 parts of calcined soda and 1500 parts of water. As soon as coupling is completed the dyestuff formed is precipitated by the addition of solid sodium chloride and worked up in the usual manner. It dyes wool orange shades which turn to yellowish-red shades of excellent fastness properties upon after-chroming; dyeings of similar shades are obtained by using the dyestuff for dyeing chrome-mordanted wool.

Example 2

223 parts of 1-hydroxy-2-amino-4-chlorobenzene-6-sulphonic acid are diazotized in the usual manner and the solution obtained is added to a solution of 210 parts of 1-phenyl-5-pyrazolone-3-carboxylic acid amide in a mixture of 250 parts of calcined soda and 1500 parts of water. The dyestuff obtained dyes wool orange shades which by treatment with agents supplying chromium yield Bordeaux shades of excellent fastness properties, especially very good fastness to light; dyeings of similar shades may be obtained directly by dyeing chrome-mordanted wool with the dyestuff.

Example 3

The solution of the diazo compound of 203 parts of 1-hydroxy-2-amino-4-methylbenzene-6-sulphonic acid obtained in the usual manner are allowed to flow into a solution of 210 parts of 1-phenyl-5-pyrazolone-3-carboxylic acid amide in a mixture of 1000 parts of water in 200 parts of 25 per cent ammonia. The mixture is stirred until coupling is completed. The dyestuff obtained dyes wool orange shades which upon after-chroming yield very equal dyeings of bluish-red shades possessing excellent fastness properties, especially very good fastness to light. Similar shades are obtained by dyeing chrome-mordanted wool with the said azo-dyestuff.

The dyestuff obtainable in an analogous manner from the diazo compound of 1-hydroxy-2-amino-6-methylbenzene-4-sulphonic acid and 1-phenyl-5-pyrazolone-3-carboxylic acid amide dyes wool orange shades which by after-chroming are converted into red shades of excellent fastness properties.

The foregoing examples illustrate the present invention which, however, is not restricted thereto.

What we claim is:—

1. Azo-dyestuffs corresponding to the general formula

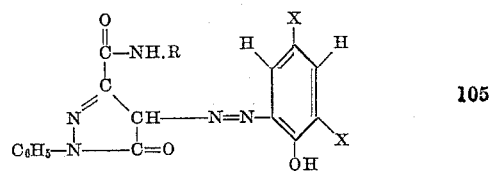

wherein one X stands for the sulphonic acid group, the other X for a substituent selected from the class consisting of chlorine and the alkyl groups and R for hydrogen or an alkyl and hydroxy alkyl group, the said dyestuffs dyeing wool usually orange shades and being capable of yielding complex chromium compounds which possess an excellent fastness to light and a very good equalizing power.

2. Azo-dyestuffs corresponding to the general formula

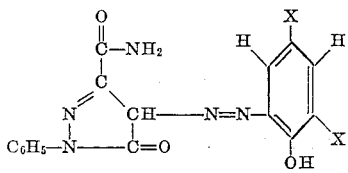

wherein one X stands for the sulphonic acid group, the other X for a substituent selected from the class consisting of chlorine and the methyl group, the said dyestuffs dyeing wool orange shades and being capable of yielding complex chromium compounds which possess an excellent fastness to light and a very good equalizing power.

3. The azo-dyestuff corresponding to the formula

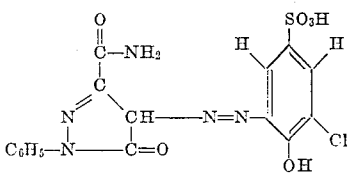

the said dyestuff dyeing wool orange shades and being capable of yielding a complex chromium compound which possesses an excellent fastness to light and a very good equalizing power and which dyes wool yellowish-red shades.

4. The dyestuff corresponding to the formula

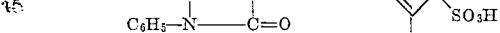

the said dyestuff dyeing wool orange shades and being capable of yielding a complex chromium compound which possesses an excellent fastness to light and a very good equalizing power and which dyes wool Bordeaux shades.

5. The azo-dyestuff corresponding to the formula

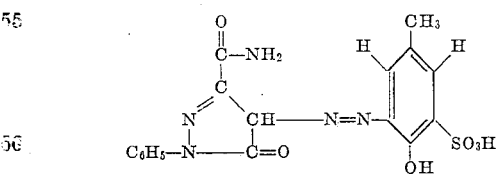

the said dyestuff dyeing wool orange shades and being capable of yielding a complex chromium compound which possesses an excellent fastness to light and a very good equalizing power and which dyes wool bluish-red shades.

6. The process of producing azo-dyestuffs which comprises coupling a compound corresponding to the general formula

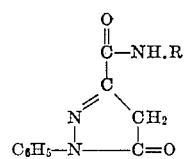

wherein R stands for hydrogen or an alkyl and hydroxyalkyl group, with the diazo compound of a compound corresponding to the general formula

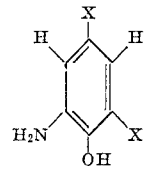

wherein one X stands for the sulphonic acid group and the other X for a substituent selected from the class consisting of chlorine and the alkyl groups.

7. The process of producing azo-dyestuffs which comprises coupling 1-phenyl - 5 - pyrazolone - 3 - carboxylic acid amide with a compound corresponding to the general formula wherein one X stands for the sulphonic acid group and the other X for a substituent selected from the class consisting of chlorine and the methyl group.

HERMANN WINKELER.
HANS REINDEL.
GUIDO FREIHERR VON ROSENBERG.